UNITED STATES PATENT OFFICE.

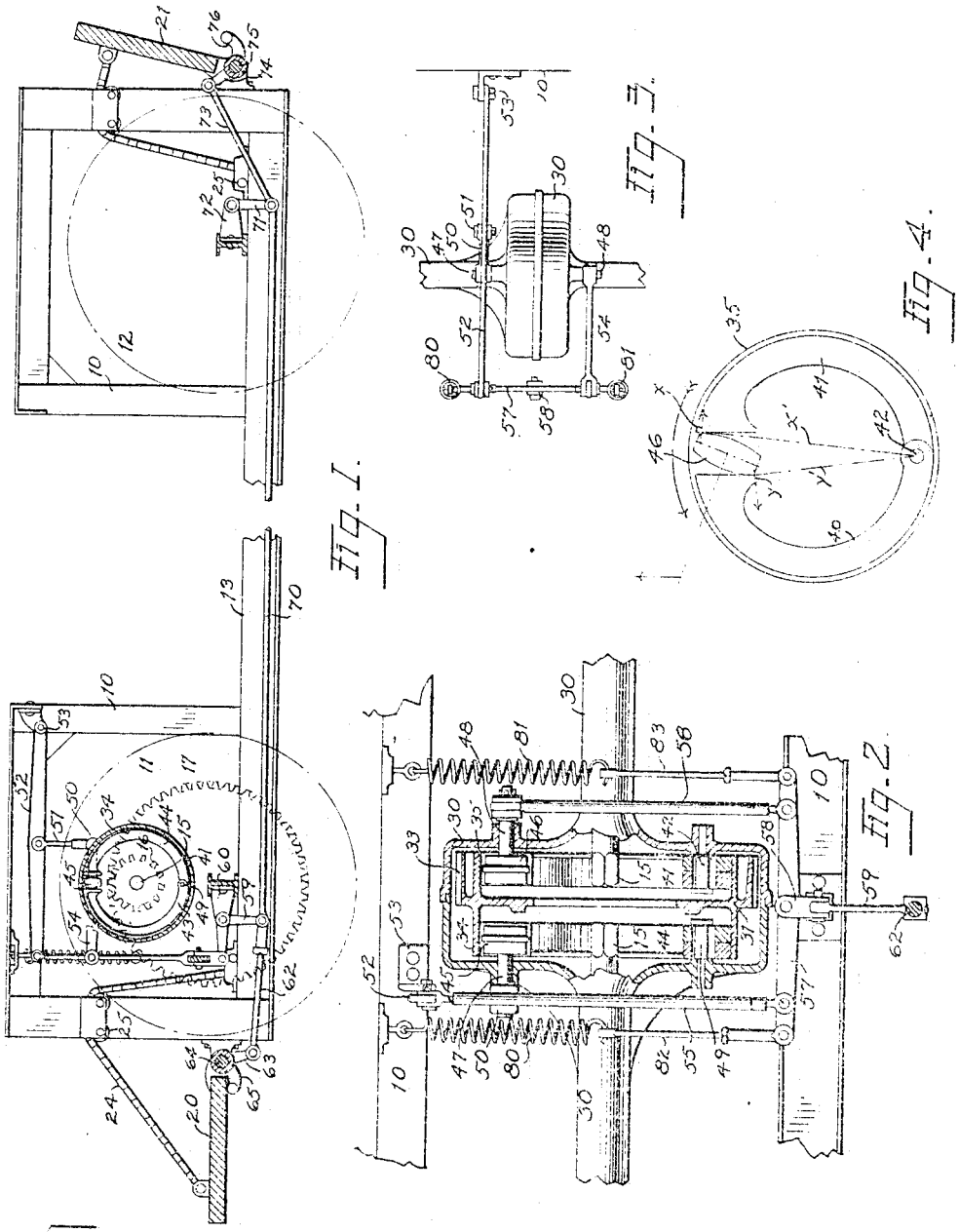

CHARLES E. F. AHLM AND CLYDE E. COCHRAN, OF CLEVELAND, OHIO, ASSIGNORS, BY MESNE ASSIGNMENTS, TO THE ELWELL-PARKER ELECTRIC COMPANY, OF CLEVELAND, OHIO, A CORPORATION OF OHIO.

VEHICLE-BRAKE.

1,121,221.      Specification of Letters Patent.      Patented Dec. 15, 1914.

Application filed July 22, 1912. Serial No. 710,888.

*To all whom it may concern:*

Be it known that we, CHARLES E. F. AHLM and CLYDE E. COCHRAN, citizens of the United States, residing at Cleveland, in the county of Cuyahoga and State of Ohio, have invented a certain new and useful Improvement in Vehicle-Brakes, of which the following is a full, clear, and exact description, reference being had to the accompanying drawings.

The object of this invention is to provide simple mechanism for effectively braking a vehicle whether it be running forward or backward.

Our mechanism is particularly well adapted for double-ended motor-driven baggage trucks which run at the same speed in either direction. To this end, we apply two brakes, one especially adapted for retarding movement in one direction and the other for movement in the other direction, and we connect these with suitable operating mechanism so that the two are concurrently applied for either direction of movement. From this there results an equivalent braking action whichever way the vehicle is run, though in one direction one brake is more effective and in the other the other brake.

The invention is hereinafter more fully explained and its essential characteristics set out in the claims.

The drawings clearly disclose our invention.

Figure 1 is a vertical, longitudinal section through a motor truck embodying the same; Fig. 2 is an enlarged, transverse section through the double brake, showing the operating mechanism; Fig. 3 is a plan of the brake-operating mechanism on a scale reduced from Fig. 2; Fig. 4 is a diagram illustrating the braking action.

As shown in Fig. 1, 10 represents the frame of the truck, and 11 and 12 the wheels thereof. The frame is shown as intermediately dropped to a lower level 13. One of the raised end portions of the frame houses suitable driving mechanism, and there may be driving mechanism in the other end portion if desired. The driving mechanism shown in Fig. 1 at the left hand end of the truck, consists of suitably driven alined shafts 15 carrying pinions 16 meshing with internal gears 17 on the corresponding wheels 11.

20 and 21, in Fig. 1, represent a pair of platforms at the opposite ends of the truck, adapted to support the attendant. The platforms are shown as suitably connected by a chain 24 passing over pulleys 25, so that, when one platform is depressed, the other is thereby raised. Fig. 1 shows the parts in the position they occupy when the operator is standing on the platform 20, and the truck is adapted to move toward the left.

In the drawings we have shown our brake mechanism connected with the platforms so that, when the operator removes his weight from the platform he has been occupying, the brake is automatically applied. This feature of applying the brake by the rising of a platform which tends to rise when the operator steps off of it, is covered in a corresponding application of ours, filed concurrently herewith.

The present invention includes our double brake, however applied, and also the double brake applied from opposite ends of the vehicle without reference to the specific means by which it is applied and without reference to whether the application of the brake is made by the raising of the platform, or otherwise.

As above stated, the truck is driven by the rotation of the driving shafts 15. Fig. 2 shows two of these shafts housed in a differential casing 30 and rotated by suitably driven differential mechanism. This view shows the main differential driving member 31, which is suitably connected by any usual means (not shown) with the live shafts 15 and carries the spur gear 33, adapted to mesh with a driving pinion on an armature shaft (not shown) or with other suitable driving mechanism, it being understood that when the member 31 is rotated, the two live shafts 15 are rotated to drive the truck.

Our double brake may be applied in any suitable form, but we find it very convenient to apply it on the inner periphery of the differential driver 31. To this end, the differential driver is provided with two drums 34 and 35. Within each drum are a pair of brake shoes. Thus, within the drum 35 are shoes 40, and 41, pivoted together at 42 on a stud which is mounted in the differential casing 30, and within the drum 34 are similar shoes 43 and 44 pivoted on the stud 49. Diametrically opposite the pivots 42 and 49, the shoes are spaced apart, and, between them, are oscillatable operating blocks 45 and 46 respectively. These blocks are on rock shafts 47 and 48, respectively, which are journaled in the differential casing 30. It will, accordingly, be seen that when the shafts 47 and 48 are rocked, the blocks force apart the brake shoes and thereby apply the brakes to the drums on the differential driver.

To rock the blocks 45 and 46, and thereby apply the brakes, we provide the following mechanism: The shaft 47 has rigid with it a rock arm 50, which is connected by a link 51 with the lever 52 pivoted to a frame bracket at 53. The rock shaft 48 has a rock arm 54. Depending from the end of the lever 52 and from the end of the arm 54 are links 55 and 56 which are connected at their lower ends with an equalizing bar 57. 80 and 81 indicate tension springs, connected with the equalizing bar by links 82 and 83, and tending to raise that bar and apply the brakes. Leading downward from the mid point of the equalizer bar is a link 58, which is connected with a bell crank 59, suitably mounted on the frame bracket 60. The lower end of the bell crank 59 connects with a rock arm 63 sleeved on the pivot rod 64 of the platform 20 and having a rigid rock arm 65 extending beneath the platform. The bell crank 59 is also connected by the link 70 with a swinging arm 71 pivoted on the bracket 72 and with a link 73 leading to a rock arm 74 sleeved on the rod 75 of the platform 21 at the other end of the truck. Projecting from the sleeve 75 is a rigid rock arm 76 extending beneath this platform.

With the construction described, when one platform is down and the other elevated, the different links are held in the position shown in Fig. 1, which holds blocks 45 and 46 in their mid-position with the brake shoes out of action. As soon, however, as the operator's weight is removed from the platform, the springs 80 and 81 are enabled to draw up the equalized bar, the links thereby moving toward the left and the holding rock arms 65 and 76 rising as the platform rises. In this movement, the arm 54 is rocked upwardly and the lever 52 is moved upwardly on its pivot, which rocks upwardly the arm 50. The two arms 54 and 50, engaging their respective blocks from diametrically opposite directions, it follows that the blocks are oppositely rocked when the arms are raised. This movement, as will be seen, applies one brake by rocking its block in one direction, the other brake by rocking its block in the opposite direction, and this movement is the same, whichever platform is raised.

The purpose of rocking the two blocks 45 and 46 in opposite directions is illustrated by the diagram in Fig. 4. This view shows that brake which is designed to be most effective when the differential driver is moving in the direction of the arrow in this view. It will be seen that, in such movement, the brake shoe 40, which is drawn into increasingly tight engagement by the movement of the differential driver itself, is intrinsically more effective than the brake shoe 41. Now, by applying the brake shoe 41 by a right hand turn of the block 46, we cause the point of application of the power to be close to the outer edge of the brake shoe; that is, the point designated $x$ in the drawings. This gives a more effective application than if it were at the point designated $y$, for two reasons: First, the theoretic lever arm $x'$ about which the force is applied is longer than if the force were applied at the opposite corner of the block marked $y$. Moreover, there is less material between the point of application and the braking surface, and hence less loss due to elasticity.

By the movement described, the brake shoe 40 is engaged at the point $y$ with an effective lever $y'$. This is not as effective as the application of the shoe 41. Thus the brake shoe 41, which tends to be crowded away from the braking drum by the movement of that drum, and hence, has an intrinsic braking action for that direction of movement less than that of the shoe 41, is applied by a more effective leverage than the brake shoe 40 which is intrinsically more effective.

It will be seen, therefore, that our system uses the most effective point of application on the shoe which is adapted to have less effective braking contact, and the less effective action in the more effective shoe, so that the braking action is compensated. Now, the other block 45 swings in the opposite direction and produces a converse result with the other brake shoes. The result is that, whatever be the direction of rotation of the differential driving member, that brake shoe which is adapted for the less effective braking of the vehicle when moving in that direction, is applied with the most effective braking force, while the less effective braking force is reserved for the shoe which is intrinsically most effective. In other words, the braking action is accomplished for one direction of movement primarily and compensatingly by one brake and secondarily by the crowding shoe of the other brake (the trailing shoe of the other brake being comparatively inefficient); while, for the other direction of movement the action is primarily by both shoes of the latter brake and secondarily by the crowding shoe of the first mentioned brake. This gives an equal braking action, though by a different selection of brake shoes, for both directions of movement.

The braking system above described is admirably adapted for double ended motor baggage trucks, either end of which may be the front, and which, accordingly, run at the same speed in either direction. The braking being equivalent on either movement, the operator has the same control of the vehicle, whichever end is acting as the front. Experience has shown that such control is not obtained by the usual brake when applied to a double ended vehicle, for in ordinary automobile practice the reverse movement of the vehicle has so much less speed than the advance movement that a comparatively ineffective brake will be sufficient for the reverse movement. With a vehicle having the same speed in each direction, however, it is very important that the braking action result equally in the two directions. Otherwise the operator is subjected to a continual variation in the control of his vehicle as he changes from one end to the other. Our brake overcomes the difficulty and renders the control constant.

Having thus described our invention, what we claim is:

1. The combination, with a motor vehicle adapted to be driven in either direction, of a pair of brakes each having a shoe and a rocking block for applying it, both brakes acting on the same rotary part of the vehicle, one of said brakes being more effective for one direction of movement, the other more effective for the other direction of movement.

2. The combination, with a vehicle, of a pair of brakes thereon, each brake comprising a pair of pivoted shoes and a cam adapted to force the shoes apart into engagement with a driving member common to the two brakes, a pair of rocking blocks between the ends of the shoes for forcing them apart, and means for rocking said blocks in opposite directions in the respective brakes.

3. The combination, with a wheeled vehicle adapted to move in either direction, of a double internal brake drum, two expanding brakes within the respective parts of said drum, rocking cams for expanding said brakes respectively, and means for concurrently rocking the cams in opposite directions.

4. The combination, with a vehicle, of a pair of brakes thereon, comprising shoes adapted to be forced apart into engagement with a common driving member, a pair of rocking blocks between the ends of the shoes for forcing them apart, means for rocking said blocks in opposite directions in the respective brakes, and means operable from the two ends of the vehicle for concurrently rocking said blocks in opposite directions.

5. In a motor vehicle, the combination of rotatable driving mechanism having a pair of brake drums rigid with each other, two pairs of brake shoes, one pair for each drum, two cams for forcing the shoes of each pair to engage the respective drums, two mechanisms for operating such means, an equalizer connecting such operating mechanisms, and means for operating the equalizer.

6. The combination, with a motor driven vehicle adapted to be moved with an equal speed in opposite directions, of mechanism for driving the vehicle, and a pair of shoe brakes adapted to act on the same rotatable part of said driving mechanism, a pair of rocking members for applying the respective brakes, mechanism for rocking one member in one direction, the other in the other direction to cause one brake to be most effective for one direction of movement, the other brake most effective for the other direction of movement, an equalizer, connections between the same and the two rocking mechanisms, and means for operating the equalizer similarly from either end of the vehicle.

7. The combination of a vehicle, a pair of internal brake drums thereon rigid with each other, a pair of brake shoes within each brake drum, a rocking block between the free ends of each pair of brake shoes adapted to engage the opposite shoes at its diametrically opposite corners, whereby the rocking of a block may force apart the brake shoes to apply the brake, and means for rocking the blocks in opposite directions to cause both shoes of one brake and one shoe of the other brake to effectively engage their drum whatever be the direction of movement of the vehicle.

8. In a motor vehicle, the combination of a pair of brakes, each brake having a rock shaft for applying it, a pair of rock arms connected with their respective shaft, an equalizer bar, a link connecting it with the respective arms, means for moving the equalizer bar to rock one shaft in one direction and one in the other, so that the brakes are applied differently, brake applying means at the two ends of the vehicle, and mechanism connecting the same with the equalizer.

9. In a motor vehicle, the combination of a rotatable driving member having a pair of brake drums rigid with each other, a pair of brake shoes for each brake drum, a block for each pair of brake shoes, a rock shaft for each block, whereby the rocking of the shaft may force apart the brake shoes to apply the brake, an equalizer bar, links and arms connecting the same with the rock shaft, whereby movement of the bars in one direction rocks the shaft in opposite directions, and means for moving the equalizer.

10. In a motor vehicle, the combination of a rotatable driving member having a pair of brake drums, a pair of brake shoes for each brake drum, a block for each pair of brake shoes, a rock shaft for each block, whereby the rocking of the shaft may force apart the brake shoes to apply the brake, an equalizer bar, links and arms connecting the same with the rock shaft, means for moving the equalizer, springs for moving the equalizing bar in the brake applying direction, means at each end of the vehicle for applying the brake, and a connection between said means and the equalizer.

In testimony whereof, we hereunto affix our signatures in the presence of two witnesses.

CHARLES E. F. AHLM.
CLYDE E. COCHRAN.

Witnesses:
ALBERT H. BATES,
BRENNAN B. WEST.